Dec. 29, 1970                    D. E. GILBERT                    3,550,200
              GROOVED TAMPING FOOT FOR SEALING AND STRETCHING
Filed Dec. 13, 1968         OPEN END PARISON
                                                            2 Sheets-Sheet 1

INVENTOR.
D. E. GILBERT
BY
Young & Quigg
ATTORNEYS

Dec. 29, 1970    D. E. GILBERT    3,550,200
GROOVED TAMPING FOOT FOR SEALING AND STRETCHING
OPEN END PARISON
Filed Dec. 13, 1968    2 Sheets-Sheet 2
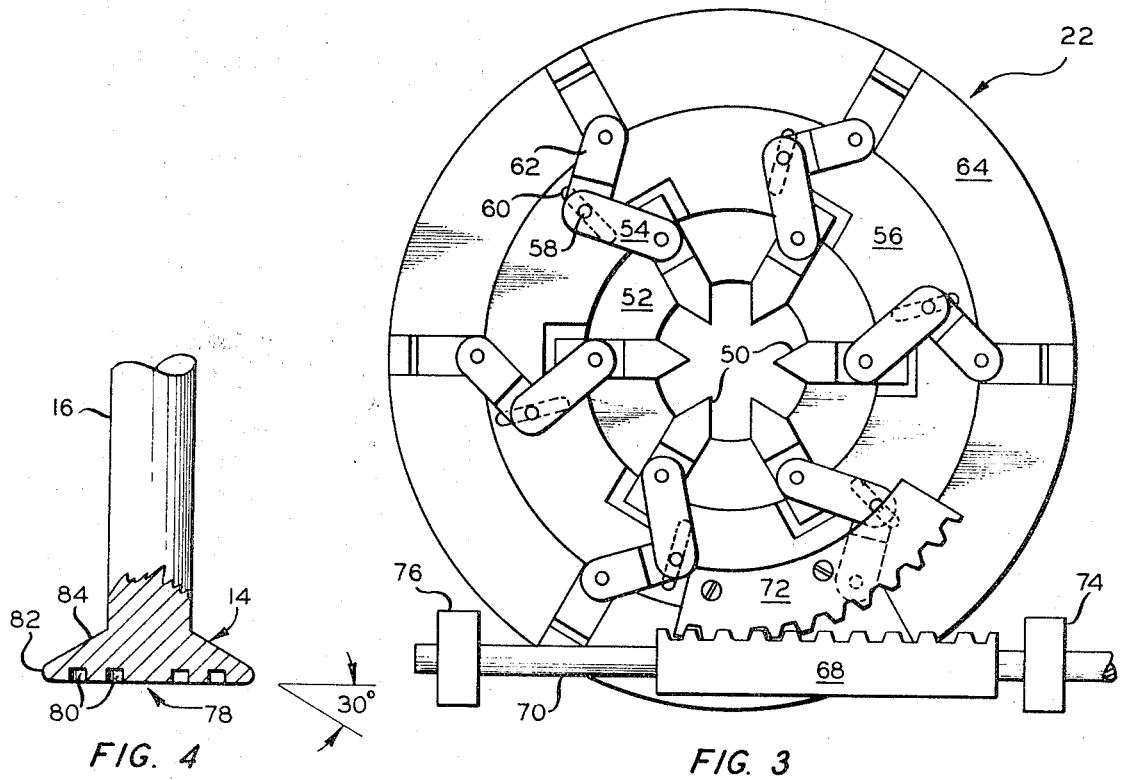
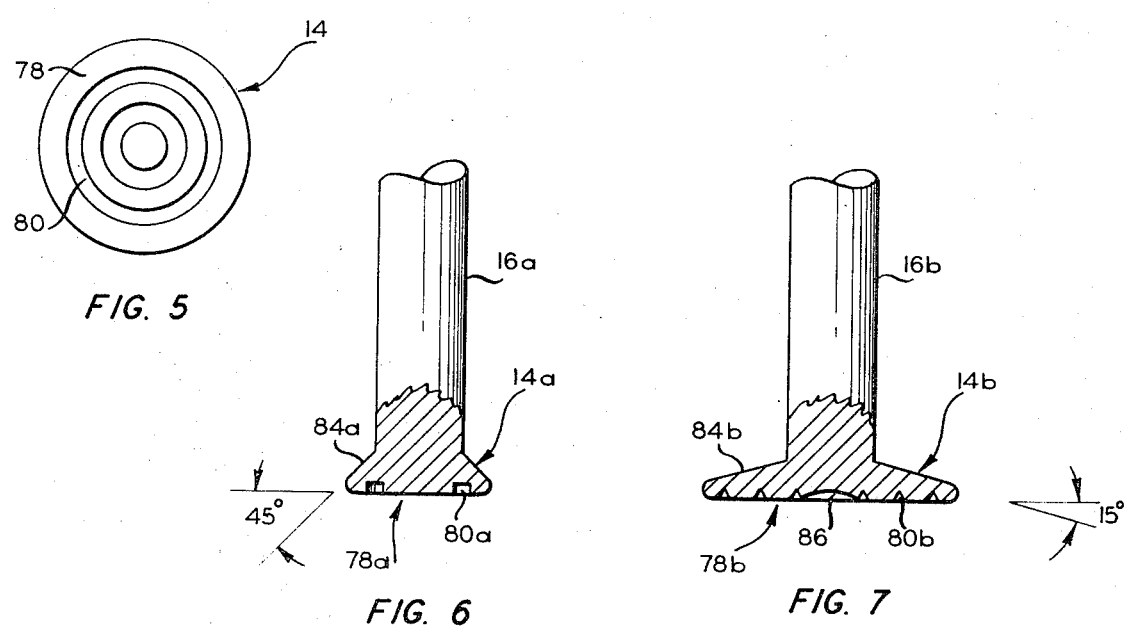
INVENTOR.
D. E. GILBERT
BY
Young & Quigg
ATTORNEYS __United States Patent Office__

3,550,200
Patented Dec. 29, 1970

3,550,200
GROOVED TAMPING FOOT FOR SEALING AND STRETCHING OPEN END PARISON
Dixie E. Gilbert, Bartlesville, Okla., assignor to Phillips Petroleum Company, a corporation of Delaware
Filed Dec. 13, 1968, Ser. No. 783,606
Int. Cl. B29c 5/06
U.S. Cl. 18—5       8 Claims

ABSTRACT OF THE DISCLOSURE

An open end parison preform is pinched shut and a grooved tamping foot is pressed against the sealed off area from the inside. Preferably the periphery of the tamping foot is formed with a radius of $\frac{1}{64}$ to $\frac{1}{16}$ of an inch with the upper portions sloping back toward the shaft at an angle of 15 to 45° included angle to the bottom face of the tamping foot.

BACKGROUND OF THE INVENTION

This invention relates to an improved apparatus for closing and stretching an open end parison preform.

While the blow molding art goes back over a 100 years, it has only been in the last dozen years that the blow molding of hollow plastic articles has achieved significant commercial success. With this expanded utilization of blow molding techniques has come progressively more rigorous requirements from the purchasers of the finished product with regard to the appearance, durability, chemical resistance, low cost, and the like of the product.

It is a well-known fact that many polymers which are particularly suitable for blow molding such as the olefin polymers, undergo the phenomenon known as orientation when stretched in the solid state at a temperature below the crystalline melt point. Since the orientation occurs at a temperature below the crystalline melt point while the polymer is on a heating cycle, it was early recognized that little orientation could be effected in a conventional blow molding operation wherein a molten parison was extruded between mold halves and blown; first the temperature of the parison could not be controlled close enough, and second the slight orientation achieved was predominantly in the circumferential direction since at best only a minor amount of stretching in the longitudinal direction occurred. One method of achieving the desired product is to extrude or mold a hollow parison preform, cool it to room temperature, carefully reheat it to just below its crystalline melt point, and then transfer it to a molding station where it is grasped at both ends, stretched longitudinally, thus imparting orientation in a longitudinal direction, and thereafter placed quickly in a mold and expanded to conform to the shape of the mold by the introduction of fluid pressure into the interior of the parison, thus stretching it circumferentially to impart orientation in a second direction. Such a procedure achieves a product of exceptional strength, and surprisingly, in the case of materials such as polypropylene, greatly improved optical properties.

As a matter of economics, it is much preferred to form the parison prefroms by extruding a continuous length of tubing and severaling said tubing to give individual parisons of a measured length, as opposed to injection molding a preform with an integral closed end. However, it has been found that the temperature at which maximum orientation occurs is below the optimum temperature for achieving the seal necessary to close one end of a parison formed by simply cutting sections from a continuous length of extruded tubing. Thus, it is necessary to effect a seal at a temperature below that at which the polymer will readily fuse together. Also, it is necessary to hold the parison securely at the pinched off end while relative movement is effected between this end and the opposite end, which is held by a gripping means.

SUMMARY OF THE INVENTION

It is an object of this invention to seal a parison preform at a temperature below the crystalline melting point. It is a further object of this invention to seal and stretch an open end parison at a temperature at which molecular orientation occurs.

In accordance with this invention, an open end parison preform at orientation temperature is pinched shut and a tamping foot having concentric grooves is pressed against the sealed off area from the inside.

BRIEF DESCRIPTION OF THE DRAWINGS

In the drawings forming a part hereof, wherein like reference characters denote like parts in the various views, FIG. 3 is a plan view showing the pinching mechanism in greater detail; FIG. 4 is a cross-sectional view of the tamping foot of FIG. 2, FIG. 5 is a plan view of lower surface of FIG. 4; and FIGS. 6 and 7 are sectional views showing alternate embodiments of the tamping foot configuration.

DESCRIPTION OF THE PREFERRED EMBODIMENTS

Figure 1:
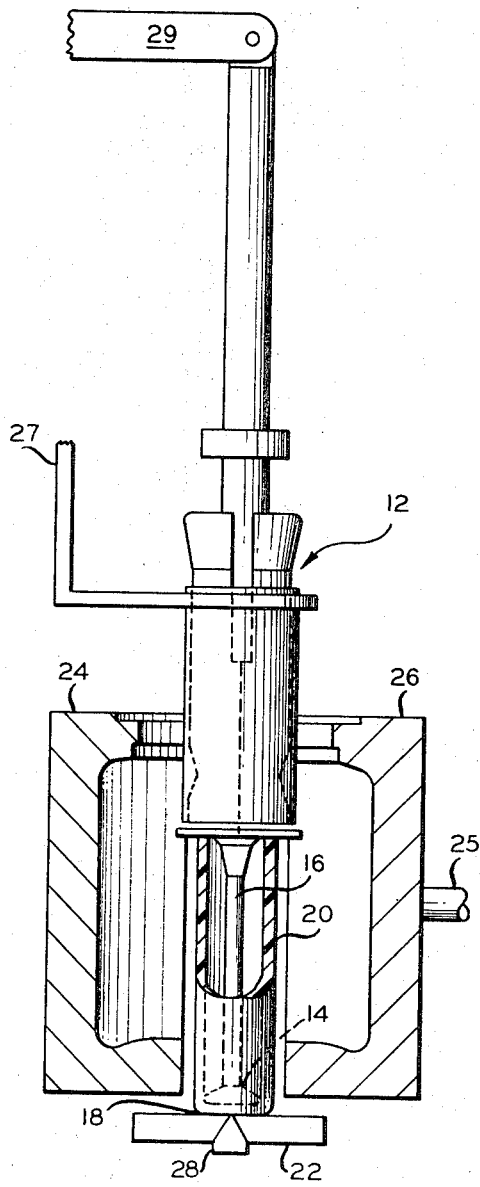
FIG. 1 is a side view partially in section of a blow molding apparatus utilizing the tamping foot of the instant invention.

The novel tamping of the instant invention can be used in any apparatus for closing an open parison at a temperature below the crystalline melting point thereof. Such apparatus is shown in Turner et al., U.S. 3,390,426, issued July 2, 1968, for instance.

Apparatus utilizing the novel tamping foot of the instant invention is of particular utility in blow molding articles made from hollow thermoplastic parison preforms of any orientable thermoplastic material such as polymers at least one 1-olefiin, said 1-olefiin having 2 to 8 carbon atoms per molecule, poly(vinyl chloride), and the like. Especially useful polymers for making these parisons are polymers of 1-olefins selected from the group consisting of ethylene, propylene, butene, and mixtures thereof, particularly, polypropylene.

These polymers can be extruded into a continuous length of tubing which is severed into individual parisons of the desired length. These hollow parison preforms are then reheated to a temperature within the range of about 1 to about 50° below the crystalline melting point of the thermoplastic material. These parisons while heated to orientation temperature are closed off at one end, for instance, by means of pinching jaws which come in from opposite sides to close the parison, or else by means of a pinching means which closes the parison by means of a plurality of radially disposed pointed pinching means.

After the parison is pinched shut, the grooved tamping foot of the instant invention presses against the sealed off area from the inside pressing said sealed off end against the pinching means so as to effect flow of the substantially solid polymer to provide a good seal. While the parison is held at the closed off end by means of the tamping foot pressing the end of the parison against the pinching means, relative axial movement can be effected between the pinched off end and the other end which is grasped, for instance, with a gripping and neck forming means so as to give molecular orientation in the longitudinal direction.

In a preferred embodiment, the pinching jaws initially come together only enough to close and seal an open end of the parison. The tamping foot then comes down to aid in forming the seal. The jaws thereafter come completely together to sever the parison and relative axial movement is effected between the gripping means holding the top of the parison and the closed off bottom end.

Since it is necessary to effect these operations on the parison while the parison is at a temperature below that at which it is fusible and easily workable, if orientation is to be achieved, certain very difficult problems arise. First, the sealing operation must take place at a temperature below that at which the polymer is appreciably tacky and fusable. By means of pressing against the inside of the closed off parison with the grooved tamping foot of the instant invention, it is possible to effect a certain amount of flow of the polymer, thus aiding in achieving a seal, and in addition, to impart contours to the bottom of the article which tend to distribute the stresses and thus further enhance the quality of the seal.

Second, the amount of force required to stretch the parison at this temperature is quite great. The grooves in the tamping foot tend to prevent slippage of the polymer from beneath the tamping foot during the stretching operation.

And finally, the parison tends to shrink in diameter on being stretched. It has been found, surprisingly, that by giving the edge of the tamping foot a radius of between $1/64$ and $1/16$ of an inch and sloping the upper portion back toward the shaft at an angle of 15–45° included angle to the bottom face of the tamping foot enhances the quality of the resulting product for the following reasons. By having a radius as opposed to a sharp edge around the periphery of the tamping foot, it has been found that the parison is less likely to tear in this area, and the polymer around the periphery of the tamping foot which is not specifically held under the tamping foot can slip past this edge more easily. While the radius can vary within reasonable limits, a radius in the range of $1/64$ to $1/16$ of an inch, preferably about $1/32$-inch is preferred. The upper face of the tamping foot should slope back toward the shaft at a sufficient angle that the parison as it is reduced in diameter does not contact this surface. Therefore, this angle must be no more than 45°, preferably about 30° included angle to the bottom face of the tamping foot. Structural considerations limit the lower value for the angle; generally, an angle of about 15° is the smallest angle that can be utilized without weakening the tamping foot.

The grooves can vary somewhat in which and spacing depending in part on the size of the item being formed. Generally the grooves are $1/32$ to $1/8$, preferably about $1/16$-inch wide with the spacing being within the same range. The depth too can vary, but generally is within the range of $1/64$ to $1/16$, preferably about $1/32$-inch.

The crystalline melt point can be determined by heating a small piece of the plastic under a polarizing microscope. The specimen is heated slowly and the temperature at which birefringence disappears is the crystalline melt point.

The parison can be reheated to orientation temperature by a number of means. It can be heated in an air oven, for instance, or in a fluid tank. Also, the parison can be heated by means of conduction from the outside through being placed in a metallic heating block, either with or without supplemental heat being supplied to the inside. Alternatively, the parison can be heated by means of a radiant heater on the inside about which the parison is rotated, the parison and radiant heater all being contained in a sleeve so as to conserve heat and in addition, impart supplemental heat to the parison from the outside.

By the term "molding station" as used throughout the specification, is meant either a single station where the heated parison is introduced into a mold and expanded by means of differential fluid pressure or a two or three-stage molding station wherein the parison is first stretched longitudinally to impart longitudinal orientation and then is introduced into a mold and caused to conform to the shape of the mold by introduction of fluid pressure into the interior of the parison.

Referring now to the drawings, particularly FIG. 1, there is shown blowing head 12 which carries tamping foot 14 on the end of reciprocal shaft 16. Blowing head 12 is reciprocated by member 27 attached to a frame by means not shown. Closed off end 18 of parison 20 is shown pressed against pinch-off means 22 which is spaced axially from blowing head 12. Mold halves 24 and 26 are mounted for reciprocal movement on a frame which is not shown. In the particular embodiment shown, blowing head 12 moves upwardly while tamping foot 14 presses against sealed off end 18 gripped by stationary pinch-off means 22, thus effecting a stretching of parison 20 in the axial direction. Shaft 16 carrying tamping foot 14 thus serves as a stretching means, and member 27 carried by the frame (not shown) by moving head 12 upwardly serves as the means to effect relative movement between the bottom and top ends of the parison. After blowing head 12 has raised to a point above that shown in the drawing, pinch-off means 22 closes completely to sever end 28 from the remainder of the parison. Blowing head 12 carrying stretched parison 20 is then moved so as to position parison 20 between mold halves 24 and 26. Ram 25 serves as a means to close said mold halves about said parison. Alternatively, the stretching operation can take place between separable hollow mold halves 24 and 26, pinch-off means 22 being lowered so as to clear the way for the mold halves to close. While this figure has been described in terms of blowing head 12 raising to stretch the parison, it is apparent that relative axial movement can be obtained between the ends of the parison either by raising blowing head 12, lowering pinch-off means 22, or a combination of the two. For instance, means 29 can move the stretching means (shaft 16 carrying tamping foot 14) relative to the pinching means so as effect the seal and thereafter move the tamping foot down at the same rate as the pinching means.

While this operation has been described in terms of a vertical disposition of the components, which is the preferred arrangement, it is within the scope of the invention to operate with the elements disposed in the horizontal position or at any other angle.

Figure 2:
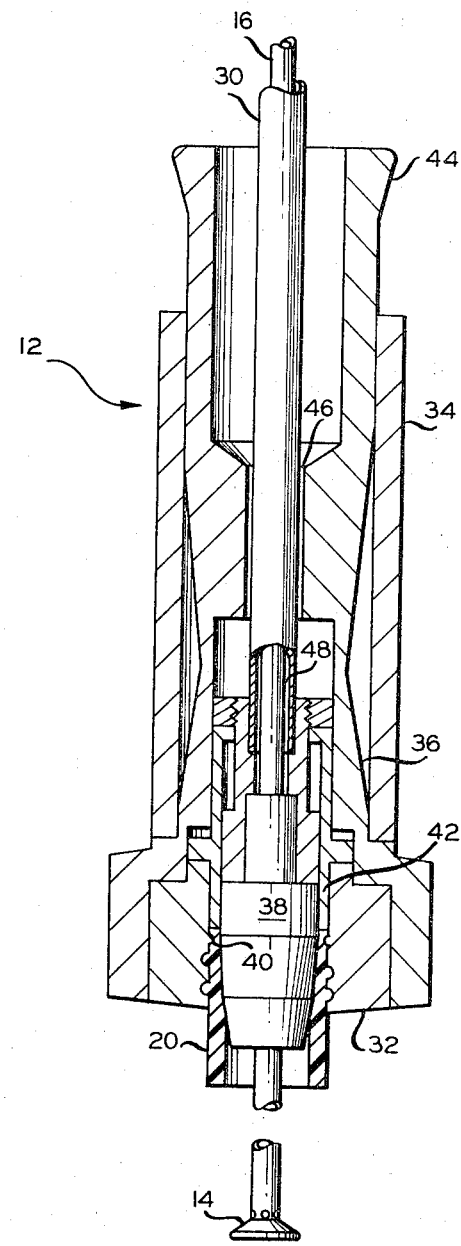
FIG. 2 is a cross-sectional view showing the gripping jaws and tamping foot in greater detail.

FIG. 2 shows a detailed view of the blowing head which carries the tamping foot. Blowing head 12 contains a hollow mandrel 30 and a plurality of gripping jaws 32. The gripping jaws are actuated by means of a collar 34 which slides down engaging first tapered surface 36 of gripping jaws 32 causing them to converge so as to enclose tapered plug 38 and clamp one end of parison 20 between tapered plug 38 on mandrel 30 and said jaws. The tapered plug is reciprocal and is moved down to aid in causing the parison to conform to the shape of the gripping jaws thereby forming the thread and/or neck area when the article being molded is a container. This plug can be made of any suitable material. One such material is polytetrafluoroethylene which has a low heat conductivity and a high melting point as well as a low coefficient of friction. As tapered plug 38 moves down, the contact of the tapered surface with the parison causes the thermoplastic material to flow laterally around annular ridge 40 which prevents further downward movement of the plug from pushing the parison axially out of the gripping jaws and allows lateral flow of the thermoplastic material into the threads and/or other contours of the neck forming area as the plug continues its descent. The plug can have an initial deep taper followed by a shallower taper or a single taper or even a curved surface such as a radius. This plug serves initially as a guide means to first enter the parison. During the last fraction of an inch of downward travel of the plug, annular collar 42 is engaged and moved downward against the end of parison 20, thus further aiding in forming the neck area, particularly the lip and adjacent surfaces.

After the parison has been stretched, blown, and moved to an ejection station, collar 34 is moved upwardly, contacting second tapered surface 44 so as to expand gripping jaws 32 by pivoting the segmented gripping jaws about point 46 on mandrel 30, and thus allowing ejection of the part.

Blowing fluid is introduced into the interior of the parison through annular space 48 between hollow mandrel 30 and shaft 16 which carries tamping foot 14, this annular space and the fluid source (not shown) forming the means for creating a pressure differnetial between the interior of said parison and said mold. Other means for introducing fluid into the parison can also be used, for instance shaft 16 can be hollow. Also, the parison can be caused to conform to the shape of the mold by means of a vacuum applied through openings in the mold walls in which case said means for introducing fluid pressure serves as a vent to the atmosphere.

FIG. 3 shows in detail one embodiment of the pinching and sealing means. A plurality of jaws 50 are attached reciprocally to ring 52 which is stationary. Linkages 54 are rotatably attached at one end to jaws 50 and at the other end, they are slidably and rotatably attached to plate 56 through pins 58 moving in slots 60 and rotatably attached to linkages 62. The last mentioned linkages are rotatably attached at the opposite ends to fixed plate 64. Plate 56 is rotatable about the central area and is actuated to rotate by rack 68 attached to pusher member 70 acting on pinion segment 72 attached to plate 56. Member 70 is slidably suported in members 74 and 76. The clockwise and counterclockwise rotation of plate 56 causes jaws 50 to reciprocate toward and away from the central area. A parison to have its end closed is placed in the central area and is accordingly pinched to seal the end of the parison and, if desired, completely pinch off to separate the material below the sealed end completely from the upper portion of the parison by the action of jaws 50 moving together in the central area toward a point.

FIG. 4 is a cross-sectional view of tamping foot 14 carried by reciprocal shaft 16. On the bottom face 78 of tamping foot 14 are a series of annular grooves 80. The peripheral edge 82 of tamping foot 14 is machined to have a radius of about 1/32 of an inch. The upper surface 84 of tamping foot 14 slopes back toward shaft 16 at an included angle to the bottom face 78 of about 30°.

In FIG. 5, there is shown a view of bottom face 78 of tamping foot 14 showing annular grooves 80.

FIG. 6 shows an alternative configuration for a tamping foot 14a having one annular groove 80a. The angle between upper surface 84a and bottom face 78a is 45°.

In FIG. 7 there is shown another alternative embodiment wherein tamping foot 14b has three concentric annular grooves 80b and wherein the angle between bottom face 78b and upper surface 84b is 15°. Central area 86 is shown having a concave shape although the flat shape shown in FIGS. 4 and 6 is preferred. Similarly, grooves 80b are shown to be triangular in shape although other shapes are possible; the rectangular shape shown in FIGS. 4 and 6 is presently preferred.

EXAMPLE

Propylene homopolymer having a density of 0.905 (ASTM D–1505–63T), a melt index of 2 (ASTM D–1238–62T, Condition L), and a crystalline melting point of 340° F. was extruded into tubing having an internal diameter of 0.8 inch and a wall thickness of 0.125 inch. The tubing was cooled to room temperature and cut into five inch lengths. These five inch lengths were heated to a temperature of 320–338° F., grasped at a first end by a gripping means such as that shown in FIG. 2 and closed off at a second end by means of a pinching means such as that shown in FIG. 3. A tamping foot having annular grooves such as that shown in FIG. 4 was then pressed down against the closed off end of the parison from the inside to aid in forming the seal. The jaws of the pinching means then were closed completely to sever the parison and the table carrying the pinch-off means was lowered while the means grasping the other end of the parison was held stationary so as to stretch the parison, the stomper foot descending at the same rate so as to maintain pressure on the bottom of the parison. Thereafter, the blowing head was moved so as to transfer the stretched parison into position between two mold halves. The mold halves were closed and fluid pressure introduced into the interior of the parison to cause the parison to conform to the shape of the mold. The resulting article had exceptional clarity and impact strength. Several thousand bottles were made using tamping feet having one, two, or three grooves, the choice of the number of grooves being determined by the size of the opening in the bottle through which the tamping foot was passed. The angle between the bottom face of the tamping feet and the upper surfaces which slope toward the shaft was 30°. These bottles were compared with bottles made using identical parisons heated in the identical manner and blown on identical apparatus except that the tamping foot had a smooth bottom surface. On the average, bottles made with the tamping foot of the invention exhibited about 30 percent fewer faulty seals as evidenced by leakage testing than the bottles made using the smooth bottomed tamping foot.

While this invention has been described in detail for the purpose of illustration, it is not to be construed as limited thereby, but is intended to cover all changes and modifications within the spirit and scope thereof.

I claim:

1. In an apparatus for forming hollow articles comprising:

(1) parison gripping means having jaw means adapted to clamp a first end of a parison, and means to actuate said jaw means to so clamp said parison;

(2) stretching means extending from said gripping means so as to be enclosed by said parison, said stretching mean having a tamping foot on the end thereof;

(3) parison pinching means spaced from said gripping means and adapted to enclose and pinch off a second end of said parison held by said gripping means;

(4) means to move said stretching means relative to said pinching means to press said pinched off second end of said parison between said tamping foot and said pinching means; and (5) means to cause relative movement between (a) said tamping foot and pinching means and (b) said jaw means so as to stretch said parison clamped therebetween, the improvement comprising at least one groove in a bottom face of said tamping foot, said groove being concentric with a shaft carrying said tamping foot.

2. Apparatus according to claim 1 wherein said tamping foot has from 1 to 3 concentric annular grooves.

3. Apparatus according to claim 1 wherein the peripheral edge of said tamping foot is contoured on a radius of between 1/64 and 1/16 of an inch.

4. Apparatus according to claim 1 wherein an upper surface of said tamping foot slopes back toward a shaft carrying said tamping foot at an included angle to a bottom face of said tamping foot of between 15 and 45°.

5. Apparatus according to claim 1 wherein said grooves have a width of between 1/32 to 1/8 inch.

6. Apparatus according to claim 1 wherein said grooves have a depth within the range 1/64 to 1/16 inch.

7. Apparatus according to claim 1 wherein the peripheral edge of said tamping foot is contoured on a radius of about 1/32 of an inch, an upper face of said tamping foot slopes back toward a shaft carrying said tamping foot at an included angle to a bottom face of said tamping foot of about 30°, between 1 and 3 concentric rows of grooves are provided, said grooves having a width of about 1/16 of an inch and a depth of about 1/32 of an inch.

8. Apparatus according to claim 1 comprising in addition:
  (6) a separable hollow mold, and means to close said mold about said stretched parison; and
  (7) means for creating a pressure differential between the interior of said parison and said mold so as to cause said parison to conform to the shape of said mold.

References Cited

UNITED STATES PATENTS

| | | | |
|---|---|---|---|
| 3,277,223 | 10/1960 | Curto | 18—5 |
| 3,390,426 | 7/1968 | Turner et al. | 18—5 |
| 3,439,380 | 4/1969 | Seefluth | 18—5 |

RICHARD J. HERBST, Primary Examiner